United States Patent
Nicolson

(10) Patent No.: US 6,461,105 B1
(45) Date of Patent: Oct. 8, 2002

(54) VARIABLE VANE FOR USE IN TURBO MACHINES

(75) Inventor: Matthew D. Nicolson, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/871,088

(22) Filed: May 31, 2001

(51) Int. Cl.[7] .............................................. F01D 17/16
(52) U.S. Cl. ................................... 415/160; 416/223 R
(58) Field of Search ................................ 415/148, 151, 415/155, 159, 160, 163, 165; 416/223 R, 226, 234, 239, 236 R, 243

(56) References Cited

U.S. PATENT DOCUMENTS 6,283,705 B1 * 9/2001 Rice et al. .................. 415/160

* cited by examiner

Primary Examiner—John E. Ryznic
(74) Attorney, Agent, or Firm—Bachman & LaPointe, P.C.

(57) ABSTRACT

With a turbo machine comprises a trunnion portion and an airfoil portion, the airfoil portion is defined by a leading edge, a trailing edge, and a pair of side edges. One or more of the side edges comprises a fin which extends from proximate to the trunnion portion toward the trailing edge of the airfoil portion. The fin tapers in thickness from the trunnion portion to the trailing edge portion. The fin may extend above and/or below the top and bottom surfaces of the airfoil. The fin may be formed on a portion of one or both of the side edges.

11 Claims, 3 Drawing Sheets

VARIABLE VANE FOR USE IN TURBO MACHINES

BACKGROUND OF THE INVENTION

Turbo machines, such as gas turbine engines, have one or more turbine modules, each of which includes a plurality of blades and vanes for exchanging energy with the working medium fluid. Some of the vanes may be fixed and others may be variable, that is, rotatable between positions in the gas turbine engine. A typical vane known in the prior art is shown in FIG. 5 and comprises, generally, a trunnion portion (a) and an airfoil portion (b). The airfoil portion comprises a leading edge (d) and a trailing edge (e). The trunnion portion (a) has an enlarged button portion (f) proximate to a transition zone (g) between the trunnion and airfoil. The variable vane in operation is mounted for rotation about axis (c) so as to locate the position of the leading edge of the airfoil as desired. Generally, the variable vane is rotated through an angle of about 40°.

Because the vanes of a gas turbine engine operate in a hostile environment, they are subjected to significant stresses, both steady stress and vibratory stress. The design of variable vanes of the prior art are such that the transition zone (g) from the trunnion portion (a stiff section of the variable vane) to the airfoil portion of the vane (a flexible section of the variable vane) is subjected to high stresses which may lead to failure of the vane at the transition area and subsequent catastrophic damage to the gas turbine engine.

Naturally, it would be highly desirable to provide a vane configuration which would reduce stress in the transition zone between the stiff portion (the trunnion) and the flexible portion (the airfoil) and provide a substantially smooth and continuous reduction in stress at the transition zone from the trunnion portion to the airfoil portion.

Accordingly, it is a principal object of the present invention to provide a vane which has reduced stress at the transition zone between the stiff section (trunnion) of the variable vane and the flexible section (airfoil) of the vane.

It is a further object of the present invention to provide in the transition zone of a variable vane a smooth and continuous reduction in stress from the stiff (trunnion) portion to the flexible (airfoil) portion of the variable vane.

It is an additional object of the present invention to provide a vane which discourages air flow from the pressure side to the suction side of the vane.

It is a still further object of the present invention to provide a variable vane useful in gas turbine engines which may be casted.

SUMMARY OF THE INVENTION

In accordance with the present invention, the vane comprises a trunnion portion and an airfoil portion, the airfoil portion is defined by a leading edge, a trailing edge, and a pair of side edges. One or more of the side edges comprises a fin which extends from proximate to the trunnion portion toward the trailing edge of the airfoil portion. The fin tapers in thickness from the trunnion portion to the trailing edge portion. The fin may extend above and/or below the top and bottom surfaces of the airfoil. The fin may be formed on a portion of one or both of the side edges.

The vane design in accordance with the present invent-on offers a number of benefits. Firstly, the provision of the fin allows for a smooth transition from the trunnion portion to the airfoil portion where the transition is formed of a thicker cross section than the airfoil itself thereby reducing stresses which normally would occur on the airfoil in the absence of the fin structure. Secondly, the design of the fin on the airfoil of the vane of the present invention substantially eliminates air flow from the pressure side of the airfoil to the suction side of the airfoil which is undesirable.

BRIEF DESCRIPTION OF THE DRAWINGS

The foregoing features and advantages of the vane of the present invention will become more apparent in light of the following description of the best mode for carrying out the invention and the accompanying drawings.

DETAILED DESCRIPTION OF PREFERRED EMBODIMENT(S)

Figure 1:
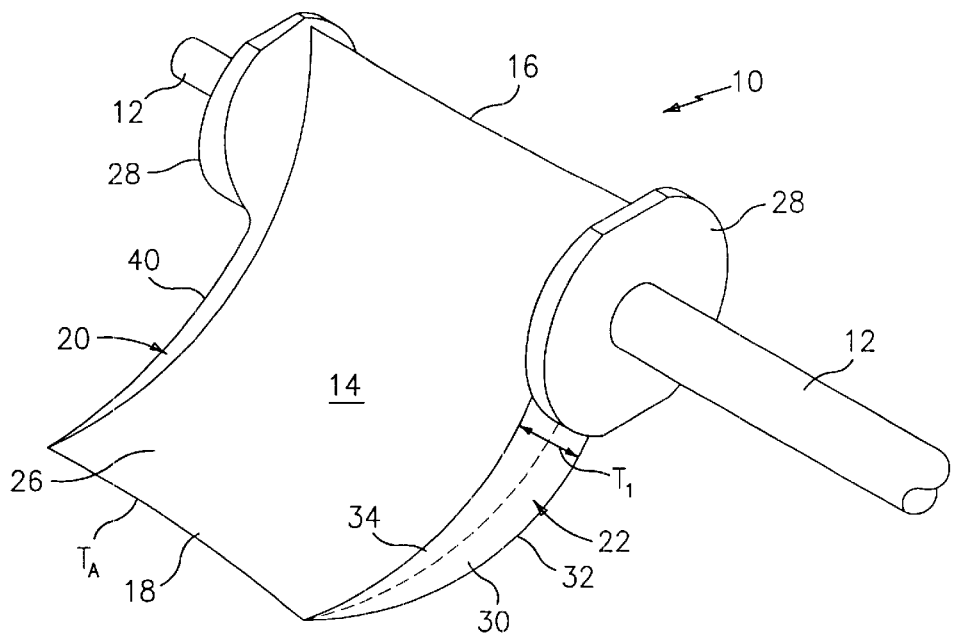
FIG. 1 is a bottom view of a vane in accordance with the present invention.
Figure 2:
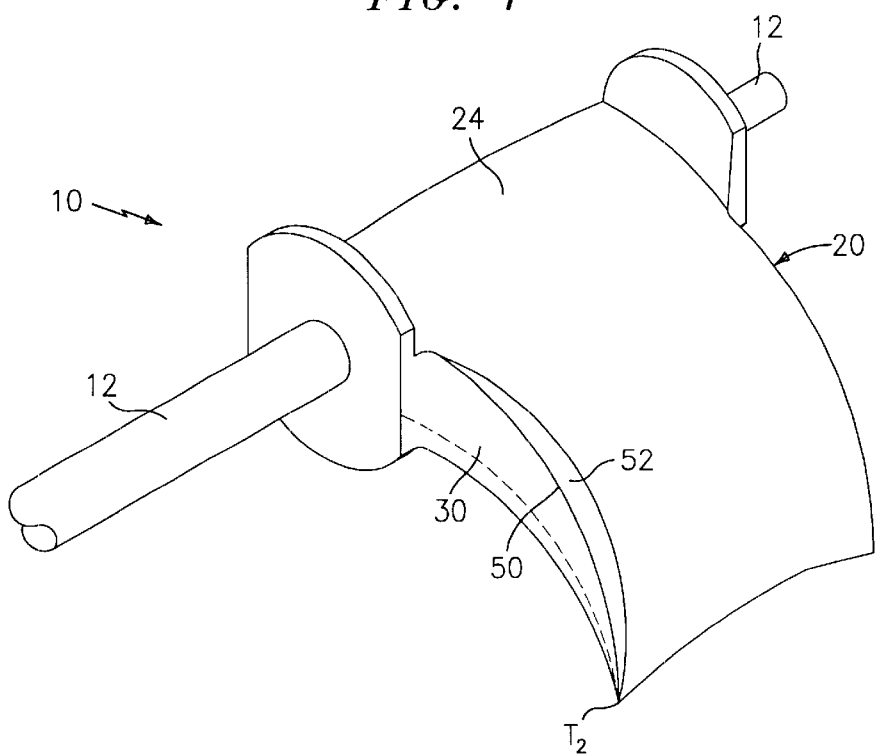
FIG. 2 is a top view of a vane in accordance with the present invention.

The vane 10 illustrated in FIGS. 1 and 2 comprise a trunnion portion 12 and an airfoil portion 14. The airfoil portion 14 has a leading edge 16, a trailing edge 18, and opposed side edges 20 and 22 which define the airfoil portion 14 having a top surface 24 and a bottom surface 26.

Figure 3:
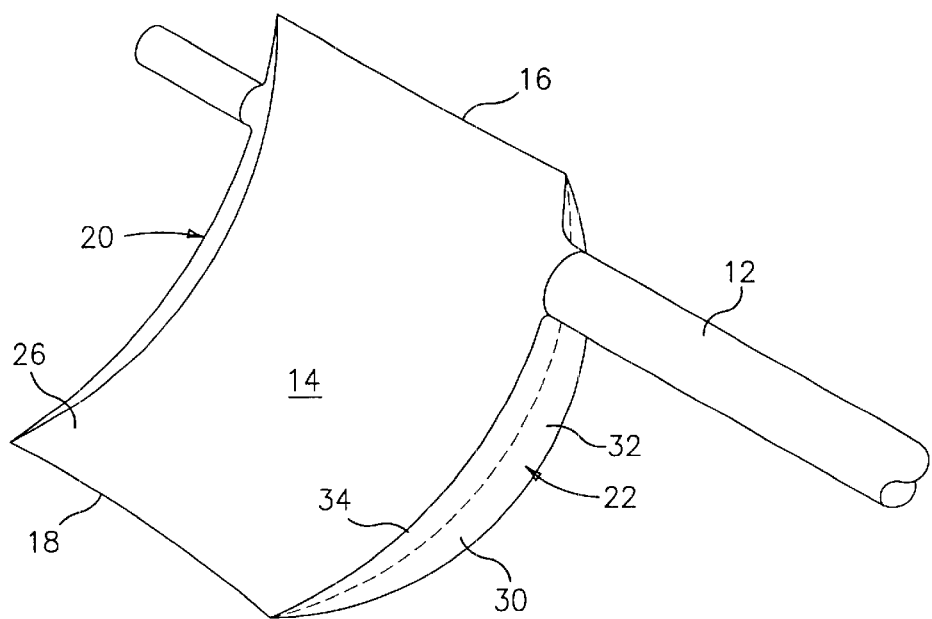
FIG. 3 is a bottom view of a second embodiment of a vane in accordance with the present invention.
Figure 4:
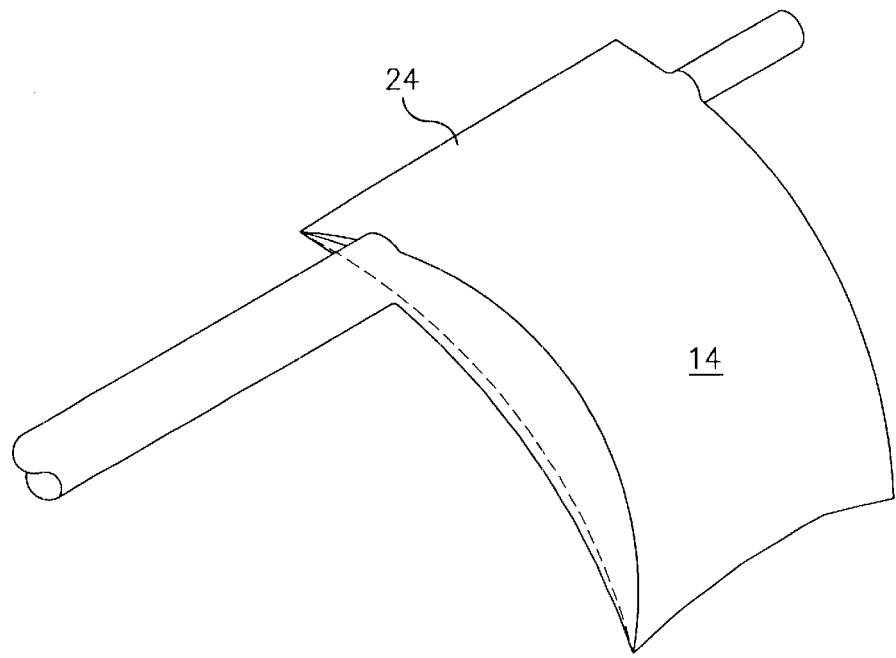
FIG. 4 is a top view of the vane of FIG. 3.
Figure 5:
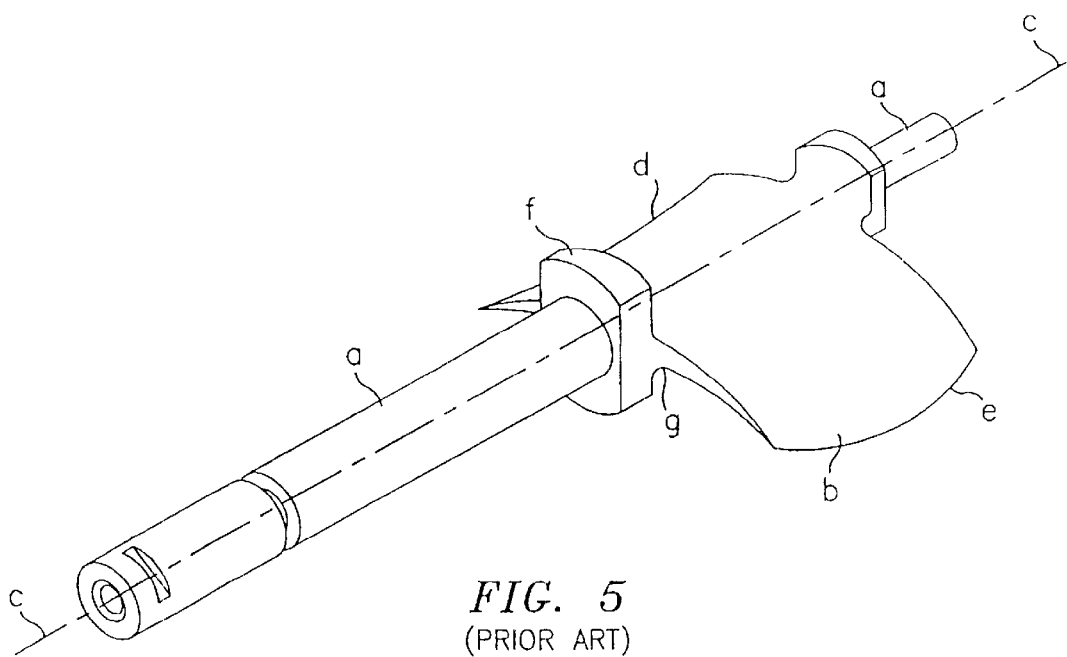
FIG. 5 illustrates a vane known in the prior art.

As shown in FIGS. 1 and 2, the trunnion portion 12 has an enlarged portion 28, referred to herein as a button portion, from which the side edges 20 and 22 radiate. As can be seen in FIGS. 3 and 4, the enlarged button portion may be eliminated and the side edges of the airfoil can radiate directly from the trunnion shaft.

Again with reference to the embodiment of FIGS. 1 and 2, the side edge 22 is provided with a fin structure 30 which tapers from a thickness $T_1$ in the area proximate to the trunnion portion to a thickness $T_2$ which is smaller than $T_1$. As illustrated in FIG. 1, the fin 30 has a portion 32 which extends above the top surface of the airfoil and a portion 34 which extends below the bottom surface 14 of the airfoil. Side edge 20 shows a fin 40 which tapers in the same manner as fin 30 from the trunnion portion to the trailing edge of the airfoil; however, the fin 40 extends only below the bottom surface 14 of the airfoil. It should be appreciated that, depending on the particular application for the vane in a jet engine, fin 40 may be of similar structure as fin 30 or, alternatively, the fins 30 and 40 could extend only above the top surface of the airfoil.

As noted above, the fins taper from a thickness $T_1$ approximate to the trunnion portion 12 to a thickness $T_2$ as the fin approaches the trailing portion 18 where $T_1$ is greater than $T_2$. In addition, the thickness $T_1$ is greater than the thickness $T_A$ of the airfoil adjacent to the fins 30 and/or 40.

As can best be seen in FIG. 2, the fin 30 has a top surface 50 and a side wall portion 52 which extends at an acute angle with respect to the side edge 22 from the top surface 50 of the fin 30 to the top surface 24 of the airfoil. This side wall portion 52 forms a gradual transition from the fin to the airfoil so as to substantially eliminate stress concentrations at the junction of the side wall and the top surface 24 of the airfoil 14.

A second embodiment of a vane in accordance with the present invention is illustrated in FIGS. 3 and 4. With reference to FIGS. 3 and 4, the enlarged button portion 28 illustrated in FIGS. 1 and 2 has been eliminated. The vane of FIGS. 3 and 4 is otherwise similar in structure to the vane illustrated in FIGS. 1 and 2. Again, as is the case of the vane of FIGS. 1 and 2, the fin may be on one or both of the side edges 28 and 22 and may extend above or below the upper and lower portions of the airfoil 16 or above and below the airfoil 16. Again, as is the case of the vane of FIGS. 1 and 2, the fin allows for a smooth transition from the trunnion portion to the airfoil portion and substantially eliminates air flow from the pressure side of the airfoil to the suction side of the airfoil.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. In a turbo machine having at least one rotatable vane, said rotatable vane comprises a trunnion portion and an airfoil portion; the airfoil portion having a leading edge, a trailing edge and a pair of side edges which together define the airfoil portion having a top surface, a bottom surface and a thickness proximate to the side edges of $T_A$; at least one of the pair of side edges comprises a fin extending from proximate to the trunnion portion toward the trailing edge of the airfoil portion wherein the fin tapers from a thickness $T_1$ proximate to the trunnion portion to a thickness $T_2$ proximate to the trailing edge where $T_1 > T_2$ and $T_1 > T_A$.

2. A turbo machine according to claim 1, wherein the fin comprises a top surface and a side wall portion which extends at an acute angle from the top surface to the top surface of the airfoil portion to form a gradual transition from the fin to the airfoil portion.

3. A turbo machine according to claim 1, wherein the fin has a bottom surface which extends below the bottom surface of the airfoil portion.

4. A turbo machine according to claim 1, wherein each of the pair of side edges comprise a fin.

5. A turbo machine according to claim 2, wherein the thickness $T_1$ of each fin is substantially the same.

6. A turbo machine according to claim 5, wherein the thickness $T_1$ of each fin is different.

7. A turbo machine according to claim 1, wherein the fin defines a transition zone from the trunnion and reduces stress on the vane in the area of the transition zone.

8. A turbo machine according to claim 1, wherein the trunnion portion includes a shaft portion and a bottom portion and the fin extends from the bottom portion.

9. A turbo machine according to claim 4, wherein the trunnion portion comprises a shaft portion having a pair of bottom portions and a fin extend from each bottom portion.

10. A turbo machine according to claim 3, wherein each of the pair of side edges comprise a fin.

11. A turbo machine according to claim 10, wherein the trunnion portion comprises a shaft portion having a pair of bottom portions and a fin extend from each bottom portion.

* * * * *